United States Patent Office 3,300,414
Patented Jan. 24, 1967

3,300,414
PRODUCTION OF MIXTURES OF ZIRCONIUM OXIDE AND SILICIC ACID
Eugen Meyer-Simon and Artur Frey, Frankfurt am Main, Germany, assignors to Deutsche Gold- und Silber-Scheideanstalt vormals Roessler, Frankfurt am Main, Germany
No Drawing. Filed Nov. 7, 1962, Ser. No. 236,137
Claims priority, application Germany, Dec. 18, 1961, D 37,712
1 Claim. (Cl. 252—454)

The present invention relates to an improved process for the production of zirconium oxide-silicic acid mixtures.

Mixtures of zirconium oxide and silicic acid are required for various purposes, for example, in oxide ceramics, catalysts and above all for the production of ceramic pigments. In the production of such pigments certain quantities of metals, such as vanadium, are added and upon calcining such mixtures form zirconium silicate, the color of which is determined by the added metal. The very pure and cheap zircon sand (zirconium silicate) is used as the raw material source of zirconium oxide and from which the desired mixture was obtained directly by its decomposition with suitable coloring additions.

It is known, for example, that sodium-zirconium silicate can be first prepared from a zirconium silicate, extracted partially with sulfuric acid to remove the alkali metal and then calcining to produce the desired oxide mixture. In carrying out such process it was found that the extraction has to be carried out very carefully and that an excess of acid had to be avoided to prevent the production of zirconium salts and colloidal silicic acid. As these undesired reactions, however, practically can never be fully hindered and as therefor the washing out of the alkali metal salt is difficult, the mixture to be washed in general has been first dried at about 150° C., then washed free of the alkali metal and subsequently heated to 700–850° C. in order to decompose the basic zirconium salts, such as zirconium sulfate, which are present in at least small quantities. A further difficulty is that a slight excess of alkali is required for the production of sodium zirconium silicate, which excess can be of varied magnitude when the conversions are incomplete. The resulting variations in alkali content of the conversion products require variations in the quantities of acid to be employed which are not easily ascertained.

According to the invention, it was found that the disadvantages of the prior processes can be avoided by replacing the acid extraction of sodium zirconium silicate by a conversion thereof with an ammonium salt, such as, ammonium sulfate or chloride. According to the invention it is only necessary to add, to the sodium zirconium silicate which has been produced from zircon sand with soda, caustic soda or by a hydrothermal conversion, a quantity of an ammonium salt which is at least equivalent to the alkali metal content of the sodium zirconium silicate, heat such mixture to 650–950° C. and then wash the resulting intermediate product with water to free it of alkali. Any possible excess of ammonium salt is of no consequence in such process as zirconium sulfate and zirconium chloride are not stable in the reaction product at the temperature concerned. As a consequence, a zirconium oxide silicic acid mixture excellently suited for the purposes indicated above is obtained in theoretical yield.

The following example will serve to illustrate the process according to the invention.

Example 2675 g. of a reaction product of 1770 g. of zirconium silicate and 1330 g. of sodium carbonate (ratio=1:1.3) were mixed dry with 2000 g. of ammonium sulfate and such mixture heated in a rotary tube furnace to 850° C. The resulting product disintegrated easily when added to water and was easily washed free of alkali with warm water. After drying at 105° C., 1760 g. of a mixture of zirconium oxide and silica were obtained.

When the ammonium sulfate was replaced with 1620 g. of ammonium chloride the same results were obtained. The heat treatment could be carried out with equal success in crucibles.

We claim:

A process for the production of a mixture of zirconium oxide and silicic acid from a sodium zirconium silicate which comprises heating a dry mixture of such sodium zirconium silicate with an amount of an ammonium salt selected from the group consisting of ammonium sulfate and ammonium chloride which is at least equivalent to the alkali metal content of the sodium zirconium silicate to a temperature between 650 and 950° C., and washing out the reaction product with water.

References Cited by the Examiner
UNITED STATES PATENTS
2,623,833  12/1952  King et al. _____ 106—299

FOREIGN PATENTS
562,60  7/1944  Great Britain.

OSCAR R. VERTIZ, Primary Examiner.
H. T. CARTER, Assistant Examiner.